United States Patent [19]

LaChance, Jr. et al.

[11] Patent Number: 5,011,156

[45] Date of Patent: Apr. 30, 1991

[54] BOARD GAME APPARATUS

[76] Inventors: Robert J. LaChance, Jr.; Nancy LaChance, both of 38 Kensington Rd., Cranston, R.I. 02905

[21] Appl. No.: 520,037

[22] Filed: May 7, 1990

[51] Int. Cl.$^5$ ............................ A63F 3/00; G09B 5/00
[52] U.S. Cl. .................................. 273/237; 273/243; 273/263; 434/318; 434/319
[58] Field of Search ................ 273/237, 243, 249, 242, 273/263; 434/318, 319, 321

[56] References Cited

U.S. PATENT DOCUMENTS

| | | | |
|---|---|---|---|
| 4,169,601 | 10/1979 | Frischmann et al. | 273/269 |
| 4,572,513 | 2/1986 | Evans | 273/242 |
| 4,889,345 | 12/1989 | Wawryk | 273/249 |

FOREIGN PATENT DOCUMENTS

89/03007  1/1990  PCT Int'l Appl. ................ 273/237

Primary Examiner—Benjamin Layno
Attorney, Agent, or Firm—Barlow & Barlow, Ltd.

[57] ABSTRACT

A game apparatus consists essentially of a game board, cards, set of playing pieces for each player, a compact disc with multiple tracks set up in such a way that the playing pieces, or tokens, for each player will move around the board surface which may comprise a single or dual segmented path. Part or all of the segments contain one of the numbers in a two number selection code on the compact disc. Cards which are provided as part of the game apparatus, will contain a second number of the two number selection code so that as playing the game, once both numbers are determined, the player will know which track to punch in on the compact disc control. The instructions on the compact disc track will determine further moves and actions and enhances the game play.

4 Claims, 1 Drawing Sheet

BOARD GAME APPARATUS

BACKGROUND OF THE INVENTION

This invention relates to games of chance and more particularly, to a board game which utilizes as an additional instruction a plurality of recorded tracks on a recording medium as well as sets of cards which give additional instruction.

Board games have enjoyed a great deal of popularity throughout the years, perhaps motivated somewhat by one of the more popular games as seen in the Darrow Pat., No. 2,026,082, for the game known as "Monopoly". Games such as this include chance control manipulation of playing pieces to be desirable to include additional elements of chance and to that end, there is introduced a compact digital disc system which provides at least ninety-nine tracks of information that can be utilized in addition to the use of cards. Compact disc systems are basically known in the prior art as part of teaching aids and an example of this is seen in the Kerman Pat., No. 4,749,354, and in the Hon Pat., No. 4,490,810.

SUMMARY OF THE INVENTION

A microprocessor-controlled compact disc system is used in conjunction with a game board that has thereon a plurality of tracks with spaces, playing pieces or tokens, dice to determine the number of positions a player may advance, and chance cards. In particular, the tracks may have a number thereon and when a player lands on that space with a number, he can then select that track from the compact digital disc which will provide specific instructions. In addition, as desired, certain spaces will require the utilization of a card which is provided with the game apparatus.

It is therefore the primary object of the present invention to provide an entirely new, novel game structure employing game boards and compact digital discs.

DESCRIPTION OF THE PREFERRED EMBODIMENTS

Figure 1:
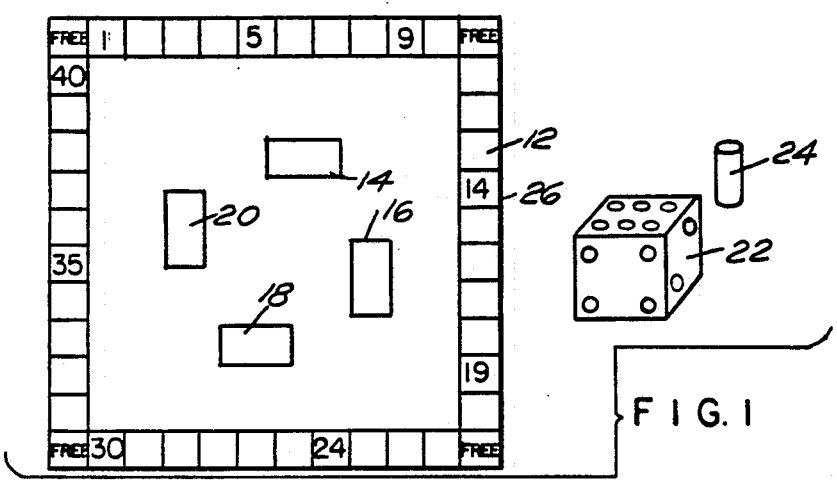
FIG. 1 is a top plan view of one form of game board that could be used with the present invention.

The game board apparatus as illustrated in FIG. 1 includes a game board 12 and stacks of chance cards 14, 16, 18 and 20. Chance devices in the form of a die 22 is provided for determining the advancement of playing pieces 24. The game board 12 includes a plurality of spaces or stations around the perimeter thereof that defines a path of travel for the playing pieces 24. Some of the stations include indicia thereon which instruct the player to perform a certain act, for example as seen in the drawing, a space such as the space designated 26, which carries the numeral 14 therein, would instruct the player to call up track 14 on the compact disc player. Similarly, certain indicia on certain stations or places will instruct the player to take one of the cards.

Figure 3:
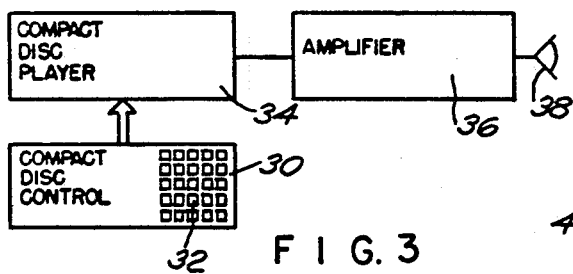
FIG. 3 is a block diagram of a compact disc system.

Referring specifically now to FIG. 3, there has been illustrated the compact disc system which is shown in the aural form although it should be understood that it could be provided in a video form as well. To this end, therefore, there is a keyboard or touch panel 30 for user entry of an input signal through a plurality of keyboards 32 and a well known to those skilled in the art, the contact closure of a key is converted to a digital signal which generates an appropriate compact disc player instruction and selects a certain track on the compact disc player 34 which then is played through an amplifier 36 and thence to either an aural speaker 38 or alternately a video screen. The instructions that are received via the track of the compact disc will then tell the player what he must do next which could include, for example, the selection of another card from one of the four stacks.

Figure 2:
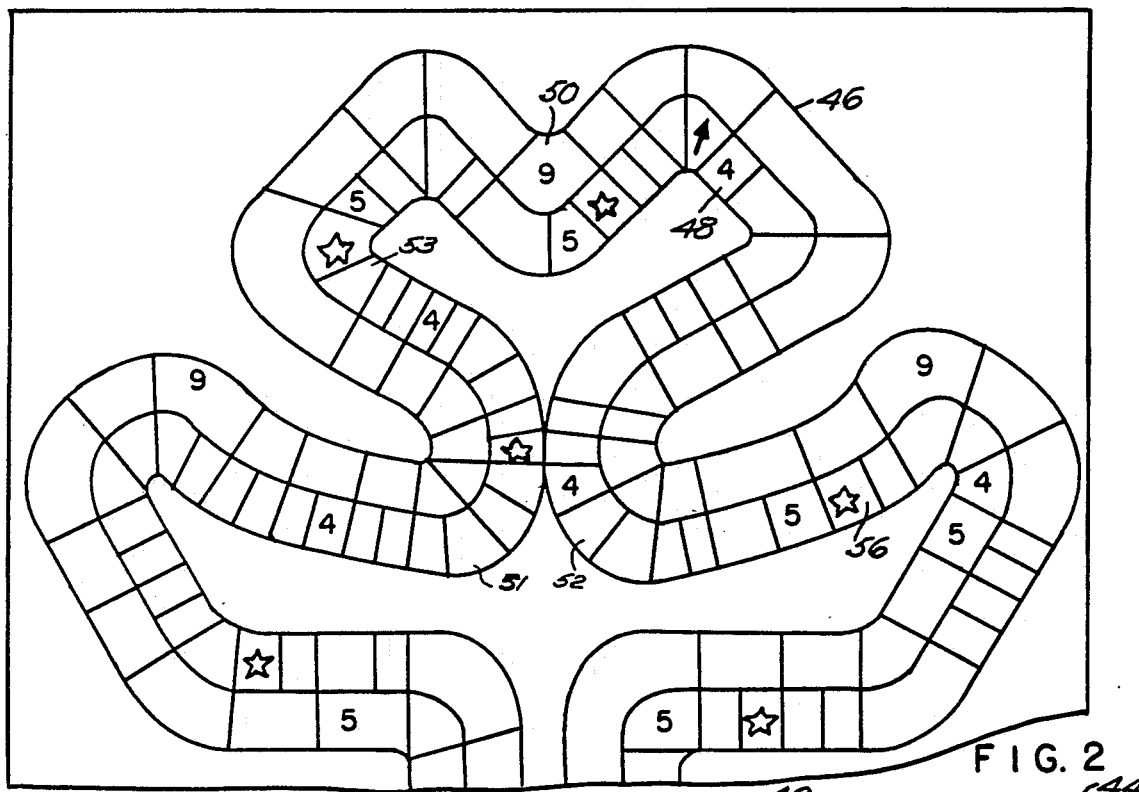
FIG. 2 is a partial top plan view of an alternate track portion of a game board.
Figure 4:
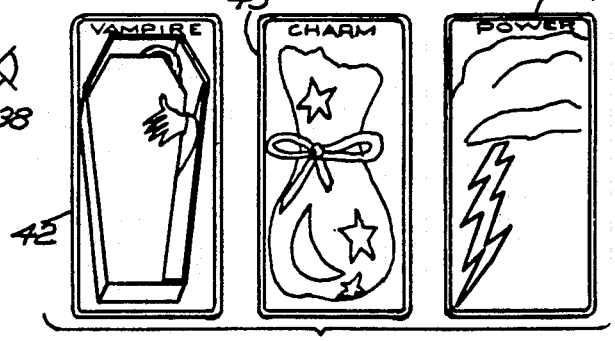
FIG. 4 is a top plan view of cards usable with one form of the invention.

In an alternate scheme of play, as seen by the dual tracks as are illustrated in FIG. 2, here we have illustrated a portion of a game board 40 which would utilize cards as seen in FIG. 4, namely a Vampire card 42, a Charm card 43 and a Power card 44 along with the compact disc apparatus as seen in FIG. 3. In this arrangement, the tracks 46 and 48 each comprise a number of stations or spaces which include indicia thereon that instruct the player. As seen in FIG. 2, a space such as 50 contains the numeral 9 and the arrangement will be such that in conjunction with one of the cards 42, 43, 44, a second number selection code will appear telling the player which number to select on the compact disc control which, in the illustrated version, will be the numeral 9 followed by a second numeral on the card. Once both numbers are determined, the proper track is played which determines further moves or actions and enhances game play.

This version of the game becomes an exciting interactive game that can be played by two to six players and in the form designed, the object is to survive a night in the castle and escape through a secret dungeon door to safety. Along the way, the player is confronted by the Count's bloodsucking entourage who try to make a vampire out of the player. The way to protect one's self is to accumulate magic Charms as seen by the card 43.

As briefly alluded to, the game contains a ninety-nine track compact disc, a playing board, playing pieces, such as 24, and a deck of cards denoted Vampire, 42, Charm, 43 and Power, 44, along with a set of dice, 22.

Each player chooses a suitable playing piece 24 and the game may begin by playing an initiating track 1 on the compact disc which introduces the players to the game. On the game board 40, there are two paths, one for humans and one for newly made vampires. The vampire path, which is illustrated as the outer path, has larger spaces as vampires move with greater speed. Humans are designed to move forward until they reach a certain spot, at which time they can move forward or backward. If, however, one becomes a vampire, the vampire path is then followed and one can only move backwards. Whenever humans and vampires travelling on parallel paths land in spaces parallel to one another, they can attack one another. See for example the spaces 51, 52, and 53. A player can obtain a Charm card by landing on a charm space which is denoted by the five pointed star, as for example a charm space 56. A Charm card will have a number of different instructions thereon, as for example one instruction could be "This card can be used in any vampire encounter. It is yours to keep unless a vampire takes it away!" The Charm cards will also bear a title, as for example Garlic, the Cross, Magic Water and the player that has, for example, a Magic Water card, can throw Magic Water on a vampire one time to send the vampire away. The Garlic card provides protection against all vampires while the Cross card provides protection in most cases but it is possible to lose it in a vampire encounter. Under certain circumstances, one can draw a secret Power card which can save one's life if all else fails. For example, the Power card would have imprinted thereon "This card will restore you once if you've been given the dark gift. You remain human, but lose one turn. Return the card to the bottom of the deck after use." In addition, the Power card will have certain other headings in addition to that just quoted as, for example, "Stake" which will enable the holder to kill the opponent who has become a vampire if he lands on a space parallel to that of a vampire. Also, there will be an invisibility card which makes one invisible from all vampires for one turn. There are some spaces designated Vampire Spaces where you have an encounter with one of the house vampires and if you land on that space, you must take a Vampire card 42 which will have a legend thereon as, for example, "The compact disc will determine the outcome of your encounter. Decide which Charm to use. The number on the Vampire Space is the first digit. Then use 8 if you have no Charms, 1 if you use Garlic, 5 if you use the Cross, 6 if you use Water and 9 if you are a vampire." If one becomes a vampire, the player can still play the game but uses a different marker and follows the vampire path moving only backwards surrendering all of his Charm cards to the deck. As a vampire, the goal is to become a human again which is only done by drinking the Magic Water which is in a certain location on the track, not necessarily shown in the drawing, or from one that one meets on a parallel space which is dangerous as one with a Stake Power card can kill the vampire and put one out of the game.

When a human lands on a space parallel to a newly made vampire, that space is essentially treated as vampire spaces and if a human lands on such a space with a new vampire, then the human must take a Vampire card and the outcome of the encounter is played out on the compact disc in the particular track that has to be played which essentially means that a certain series of first digits will be vampire encounter tracks on the compact disc.

We claim:

1. A game apparatus comprising in combination:
   a. a plurality of recorded tracks on a recordable medium;
   b. a playback apparatus for converting the recorded tracks to an audio signal;
   c. a control apparatus coupled to the playback apparatus for selecting a recorded track;
   d. a game board having at least a path of spaces thereon;
   e. tokens for each player for moving along the spaces;
   f. chance means for determining the number of spaces a player may advance; and
   g. means including specific indicia on some spaces to determine in part the track to be selected for instruction of additional movement of a player's tokens.

2. A game apparatus as in claim 1 wherein at least one set of chance cards are provided having indicia thereon give additional instruction to a player.

3. A game apparatus as in claim 1 wherein the game board has a pair of parallel paths each with distinct indicia thereon.

4. A board game apparatus, comprising
   a. a game board having a playing surface, including a path divided into discrete segments, at least some of the segments carrying numbers,
   b. a set of playing pieces for each player, which pieces are advanced along the segmented path in correspondence to a random number selection,
   c. cards which are selected randomly and used to control further movement of pieces along the path,
   d. a playing device containing pre-recorded game material for presenting discrete instruction messages, the playing device having numbered buttons corresponding to the segment numbers and serving to activate one of the recorded messages.

* * * * *